Aug. 15, 1950     A. M. LANG     2,519,056
SINGLE AIR LINE OPERATED SEDIMENT SAMPLER
Filed April 18, 1947     2 Sheets-Sheet 1
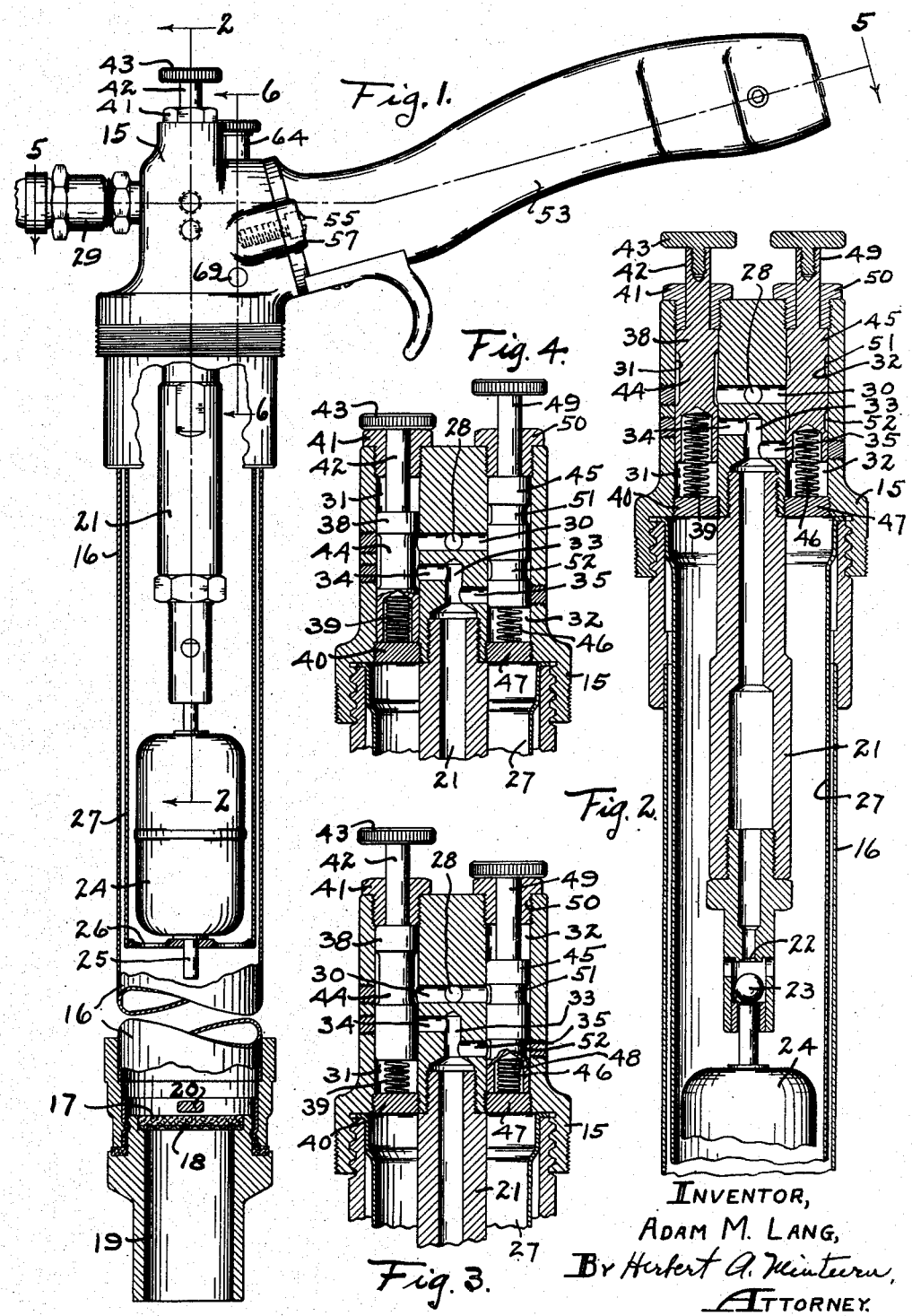
INVENTOR,
ADAM M. LANG,
By Herbert A. Minturn,
ATTORNEY.

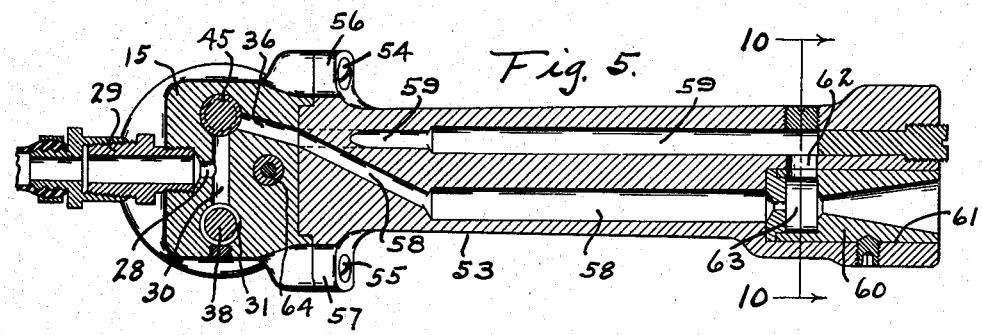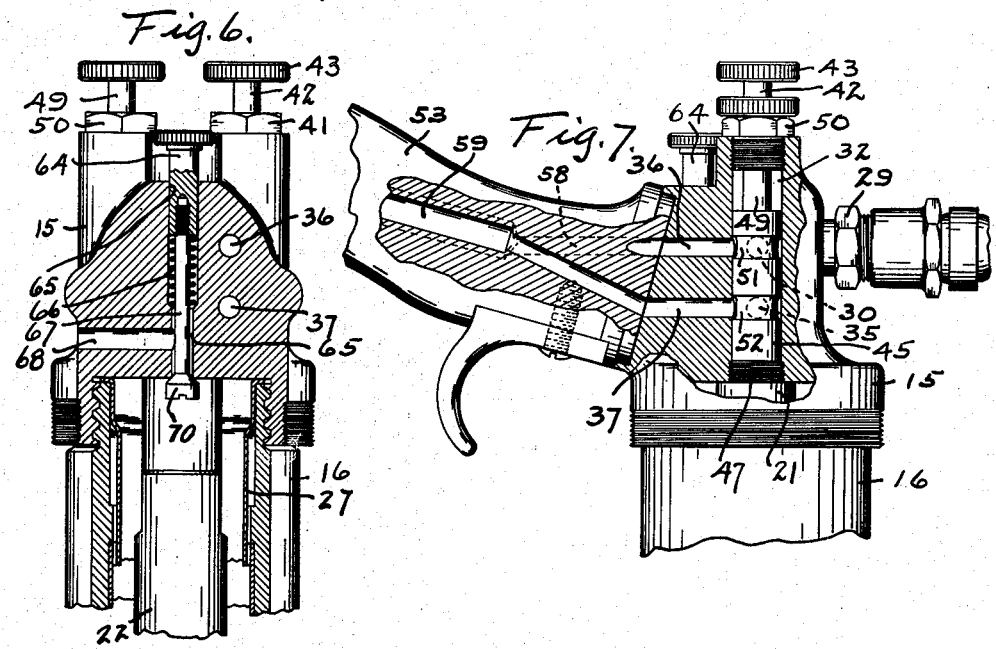

Patented Aug. 15, 1950

2,519,056

UNITED STATES PATENT OFFICE 2,519,056

SINGLE AIR LINE OPERATED SEDIMENT SAMPLER

Adam M. Lang, Indianapolis, Ind., assignor to Langenskamp-Wheeler Brass Works, Inc., Indianapolis, Ind., a corporation of Indiana Application April 18, 1947, Serial No. 742,421

4 Claims. (Cl. 137—144)

This invention relates to a device for taking milk samples in order to determine the degree of sediment or foreign matter which may have settled out of the milk in milk cans or the like as delivered to receiving stations. Generally there is a great number of milk cans received at such stations during the morning hours and a sample needs to be taken from each can. Such sampling must be done quickly in order to prevent undue delay in unloading the cans from the delivery trucks and also to get the milk into production into the stations through the usual processing and refrigerating means. Moreover the sampling must be done in a sanitary manner so that the operator's hands do not come into contact with the milk being sampled, or into contact with any instrument which does come into contact with the milk.

A primary advantage of my invention resides in the fact that it may be incorporated in a structure operated entirely by gripping a handle and selectively pressing buttons all removed from possible contact with the milk. Furthermore the invention contemplates the drawing of the sample and the returning of the sample into the same can from which it is taken without any external complicated mechanism.

The invention herein shown and described resides primarily in a control head through which air pressure is selectively carried through different passageways first to create a vacuum to withdraw the sample into a sampling tube and then by pressure to return that sample of milk through a filter pad on which sediment will be deposited.

As above indicated, a primary object of the invention resides in the unique construction of the control mechanism not only to insure the positive action described but also to prevent any possibility of any milk entering the control head under any condition.

These and other objects and advantages of the invention will become apparent to those versed in the art in the following description of one particular form of the invention as illustrated in the accompanying drawings, in which Fig. 1 is a view in side elevation and partial section of a structure embodying the invention;

Fig. 2, a view in central vertical section on an enlarged scale on the line 2—2 in Fig. 1 with the control valves in a neutral or shut off condition;

Fig. 3, a similar view in central vertical section through the control head only showing the vacuum valve depressed to create a vacuum;

Fig. 4, a view similar to that shown in Fig. 3 but with the head in condition to apply a pressure in place of a vacuum;

Fig. 5, a view in transverse section on the line 5—5 in Fig. 1;

Fig. 6, a view in vertical section on the line 6—6 in Fig. 1;

Fig. 7, a view in right hand elevation in side elevation and partial section of the control head;

Fig. 8, a top plan view;

Fig. 9, a view in front elevation of the handle only; and

Fig. 10, a view in section on the line 10—10 in Fig. 5.

Referring to the drawings, in which like characters of reference indicate like parts throughout the several views, I form a head generally designated by the numeral 15 to which is secured in any suitable manner a depending tube 16 which forms the receptacle into which the sample of milk is to be drawn. The construction of this tube 16, particularly its lower end, is set forth in my U. S. Letters Patent No. 2,400,154 issued May 14, 1946, and also my U. S. Letters Patent No. 2,153,894, issued April 11, 1939. In this respect, it is sufficient to point out that a filter pad 17 is placed across a perforated floor 18 supported by a nipple 19 in the lower end of the tube 16 and milk drawn up through the nipple 19 will fold the filter 17 upwardly above the crossbar 20 and then when milk is forced downwardly out of the tube 16, the filter 17 will seat itself as indicated in Fig. 1, to cause the milk to be forced through the filter.

The head 15 has secured to it from its under side a tube 21 extending downwardly within the tube 16 to carry on its lower end a valve seat 22 against which a ball 23 may be seated by a float 24 rising thereagainst as the milk level in the tube 16 causes the float 24 to be lifted upwardly. The float 24 is guided by a stem 25 slidingly passing through a spider 26 mounted at the lower end of an internal tube 27 in turn carried in a fixed manner to extend downwardly from the head 15. The float arrangement is likewise fully described in my two prior patents above indicated.

The head 15 has a bore 28 entering from its forward side to receive screw threadedly therein an air hose connecting nipple 29. This bore 28 communicates with a passageway 30.

The head 15 has a pair of spaced apart vertical bores 31 and 32 interconnected by the passageway 30. There is a central vertical bore 33 entering the head 15 from the under side, the lower end of which opens into the tube 21.

From the upper end of this central bore 33 there is a transverse passageway 34 extending over and opening into the bore 31. Spaced below the level of the passageway 34 is a passageway 35 intercommunicating with the vertical bore 33 and vertical bore 32. These passageways 30, 34 and 35 in the form herein shown, extend transversely of the head 15.

Extending rearwardly from the bore 32 are vertically spaced apart passageways 36 and 37 opening from the rear side of the head. These rearwardly extending passageways 36 and 37 leave the bore 32 at the same elevation respectively as those of the passageways 30 and 35, Fig. 7.

Within the bore 31 is slidingly carried a piston type valve 38 to be normally urged to an uppermost position by means of a compression spring 39 bearing between that valve 38 and the lower end of the bore 31, that end being herein shown as a plug 40, and the spring 39 being shown as entering within a counterbore in the lower end of the valve 38. A nut 41 is screwthreadedly entered in the upper end of the bore 31 to have the stem 42 of the valve 38 slidingly passed through that nut and carrying an operating button 43 above the nut. This nut 41 serves as a stop to limit the upper travel of the valve. This valve 38 is provided with an intermediate reduced diameter portion 44 of a length which will bridge the openings of the passageways 30 and 34 when the valve 38 is pushed down to its lowermost position, Fig. 4. When the valve 38 is in its uppermost, normal position, Fig. 3, the valve closes off at least one of the passageways 30 and 34 herein shown as closing off the passageway 34 so that there may be no flow of air from the inlet bore 28 through the valve bore 31 into the passageway 34.

In the other valve bore 32 is slidingly fitted a valve 45 normally urged to its uppermost position, Fig. 4, by means of a compression spring 46 between its lower end and the lower end of the bore 32 herein shown as consisting of a plug 47. The spring 46 enters a counterbore 48 within the lower end of the valve 45 as a means of centering the spring. The stem 49 of the valve 45 slidingly passes through a retaining nut 50 which is screwthreadedly engaged in the top end of the bore 32 to limit the outward travel of the valve 45. When the valve 45 is in the uppermost position, Fig. 4, it closes off entrances into the passageways 30 and 35. The valve 45 is provided with the upper and lower reduced diameter sections 51 and 52 respectively, the section 51 being spaced above the passageway 30 and the section 52 being spaced between the passageway 30 and the passageway 35 when the valve 45 is in the upper position, Fig. 4. These sections 51 and 52 are so spaced along the valve 45 that when the valve 45 is fully depressed, Fig. 3, these sections 51 and 52 register respectively with the openings of the passageways 30 and 35 and likewise registers, Fig. 7, with the passageways 36 and 37.

A handle 53 is shown as extending rearwardly from the body 15 and as being a separate member attached to the head 15 by means of screws 54 and 55 passing through handle ears 56 and 57 into the body 15. This handle 53 has therein two major passageways 58 and 59. The passageway 58, is in the form shown, interconnects at its front end with the upper head passageway 36 while the other passageway 59 interconnects with the lower passageway 37 in the head.

The handle passageway 58 is intercepted at its outer portion by a Venturi tube 60. This tube 60 is fitted into a counterbore 61 in the outer rear end of the handle 53 to be axially aligned with the passageway 58, Fig. 5. As indicated in Fig. 5, a transverse passageway 62 leads through the handle 53 from the passageway 59 into the throat 63 of the tube 60. Thus by flowing air under pressure from the passageway 58 through the tube 60, a degree of vacuum will be produced in the chamber 63 and thereby reduce the pressure in the passageway 59.

It is to be noted that the only outlet from the rear of the handle 53 from the passageway 59 is through the tube 60. In the head 15, back of the valves 38 and 45 is mounted a stem 64 to be vertically reciprocable within a bore 65. A spring 66 normally urges the stem 64 to an upper position. A stem 67 of smaller diameter than that of the stem 64 extends downwardly in spaced relation through a reduced diameter portion of the bore 65 to carry a conical valve 70 on its lower end normally pulled upwardly by means of the spring 66 to seat it against the margin of the lower end of the bore 65 and thus close it off. A passageway 68 leads laterally from the bore 65 to the orifice 69 on the left hand side of the head 15. Thus the normal condition of the valve 68 is a closed one.

Operation

In operating the device above described, the handle 53 is gripped by the operator and the tube 16 is inserted within the milk can (not shown) to have the nipple 19 approach the bottom of the can. By the thumb or a finger of the hand gripping the handle 53, the operator will then depress the vacuum valve 45, Fig. 3, whereupon air entering through the nipple 29 will enter the valve bore 32 around the valve section 51 from the passageway 30 and then flow rearwardly through the passageway 36 into the handle passageway 58 and discharge through the tube 60 whereupon a partial vacuum will be created within the tube 16 by reason of the communication from the passageway 59 through the head passageway 37 around the valve section 52, the passageway 35, and then passing through the tube 21. When the milk has reached the predetermined level within the tube 16 which level indicates a definite volume, the float 24 will lift to carry the ball 23 up against the seat 22 to close off the tube and hence stop the induction of the milk into the tube 16, whereupon the operator will release the valve 45 to allow it to return to its normal position, Fig. 4.

Then the operator will depress the valve 38 to allow the air pressure entering through the bore 28 and flowing through the passageway 30 around the valve portion 44, into the passageway 34, and down through the vertical passageway 33 through the tube 21 to blow the milk back out of the tube 16 through the filter pad 17. Thus by a single air hose connection, supplying the air to the head 15 under pressure, both pressure and vacuum may be produced for the expelling and intake of the milk within the sampling tube. By reason of the presence of the float 24, no milk can at any time enter into the passageways or body of the head 15 or of the handle 53 and thus there is no danger of contamination from that source. The stem 64 may be depressed at any time desirable to restore the interior pressure of the tube 16 to atmospheric pressure.

Thus it is to be seen that a very unique, compact and efficiently operating control mechanism is provided by the invention, and while I have described the invention in the one particular form, it is obvious that structural changes may be employed without departing from the spirit of the invention, and I therefore do not desire to be limited to that precise form beyond the limitations which may be imposed by the following claims.

I claim:

1. A milk sampler control head comprising a body having a pair of spaced apart vertical bores both closed at their lower ends, a transverse passageway interconnecting said bores, a vertical passageway opening from the underside of the body, a second transverse passageway interconnecting one of said bores and said vertical passageway, a third transverse passageway interconnecting said other bore and said vertical passageway, and an air pressure inlet passage opening into said first transverse passageway, a valve in said first bore normally closing off in one position at least one of the openings into said first and second passageways and in a second position interconnecting said first and second passageways; a valve in said second bore at all times closing off direct communication through said bore between said first and said third passageways and normally closing off said first and third passageways; said head having a pressure and a vacuum passageway leading respectively from said second bore; a Venturi tube in said pressure passageway discharging to the atmosphere, and said vacuum passageway opening into the throat of said tube; said second valve being formed, upon shifting from said normal position, to interconnect respectively said first passageway and said pressure passageway and simultaneously said third passageway and said vacuum passageway.

2. A milk sampler control head comprising a body having a pair of spaced apart vertical bores both closed at their lower ends, a transverse passageway interconnecting said bores, a vertical passageway opening from the underside of the body, a second transverse passageway interconnecting one of said bores and said vertical passageway, a third transverse passageway interconnecting said other bore and said vertical passageway, and an air pressure inlet passage opening into said first transverse passageway, a valve in said first bore normally closing off in one position at least one of said openings into said first and second passageways and in a second position interconnecting said first and second passageways; a valve in said second bore at all times closing off direct communication through said bore between said first and said third passageways and normally closing off said first and third passageways; said head having a pressure and a vacuum passageway leading respectively from said second bore; a Venturi tube in said pressure passageway discharging to the atmosphere, and said vacuum passageway opening into the throat of said tube; said second valve being formed, upon shifting from said normal position, to interconnect respectively said first passageway and said pressure passageway and simultaneously said third passageway and said vacuum passageway; said head having a handle extending laterally therefrom, and said pressure and vacuum passageways, and said Venturi tube extending substantially longitudinally in said handle to space said Venturi tube from said body and direct the discharge thereof laterally from the body.

3. A milk sampler control head comprising a body having a pair of spaced apart vertical bores both closed at their lower ends; a transverse passageway interconnecting said bores, a vertical passageway opening from the underside of the body, a second transverse passageway interconnecting one of said bores and said vertical passageway, a third transverse passageway interconnecting said other bore and said vertical passageway, and an air pressure inlet passage opening into said first transverse passageway, a valve in said first bore normally closing off in one position at least one of the openings into said first and second passageways and in a second position interconnecting said first and second passageways; a valve in said second bore at all times closing off direct communication through said bore between said first and said third passageways and normally closing off said first and third passageways; said head having a pressure and a vacuum passageway leading respectively from said second bore; a Venturi tube in said pressure passageway discharging to the atmosphere, and said vacuum passageway opening into the throat of said tube; said second valve being formed, upon shifting from said normal position, to interconnect respectively said first passageway and said pressure passageway and simultaneously said third passageway and said vacuum passageway; both of said valves being vertically reciprocable in their respective bores; and spring urged to their said normal positions, said first valve having a central restricted section of less diameter than end portions of diameters for sliding fits in its bore, the length of the restricted section being sufficient to bridge the openings into the bore of said first and second passageways, when said first valve is shifted from its normal position; and said second valve having two spaced grooves therearound to afford passages across the second bore respectively for said first to pressure passageways and said third to vacuum passageways when shifted from its normal position.

4. A milk sampler control head for a milk receiving tube comprising a body having two separate valve bores having a common passageway therebetween and in communication with said tube; said body having an air pressure passageway entering from the outside and communicating with both of said bores; a valve member in each of said bores; yielding means normally positioning said valve members to close off communication through said bores between both of said passageways; pressure-actuated vacuum producing means; said body having a passageway from one of said bores connecting with said vacuum producing means normally closed off by the valve member in that bore; said valve members being selectively shiftable against said yielding means to have a valve member in one of said bores interconnect said pressure passageway with said common passageway, and the other valve member being selectively shiftable against its said yielding means with said common passageway; means automatically closing said common passageway upon a predetermined height of milk being had in said tube; and means for interconnecting said tube to atmospheric pressure independently of both of said valve members.

ADAM M. LANG.

REFERENCES CITED

The following references are of record in the file of this patent:

UNITED STATES PATENTS

| Number | Name | Date |
| --- | --- | --- |
| 2,400,154 | Lang | May 14, 1946 |
| 2,400,651 | Marsh | May 21, 1946 |
| 2,435,578 | Ferraex, Jr. | Feb. 10, 1948 |